April 19, 1966 W. JAKOWCHUK 3,246,663
IMPULSE VALVE
Filed Nov. 16, 1964 2 Sheets-Sheet 1

INVENTOR:
WALTER JAKOWCHUK
BY
Dawson, Tilton, Fallon, Lungmus & Alexander
ATT'YS April 19, 1966  W. JAKOWCHUK  3,246,663
IMPULSE VALVE
Filed Nov. 16, 1964  2 Sheets-Sheet 2

INVENTOR:
WALTER JAKOWCHUK
BY
Dawson, Tilton, Fallon, Lungmus & Alexander
ATT'YS

United States Patent Office 3,246,663
Patented Apr. 19, 1966

3,246,663
IMPULSE VALVE
Walter Jakowchuk, Melrose Park, Ill., assignor to Mead Specialties Company, Inc., Chicago, Ill., a corporation of Illinois
Filed Nov. 16, 1964, Ser. No. 411,411
6 Claims. (Cl. 137—102)

This application is a continuation-in-part of my copending application, Serial No. 255,970, filed February 4, 1963, now Patent No. 3,190,182.

This invention relates to an impulse valve and to novel systems incorporating the same.

The invention finds utility in connection with those pressure fluid systems where application of fluid pressure is desired only to provide a discrete response, i.e., an impulse or burst of pressure irrespective of the continuation of the initiating signal to the system. The provision of such a valve constitutes an important object of the invention, and further objects may be seen in the details of construction and operation set down in this specification.

The invention is explained in conjunction with the accompanying drawing, in which.

Figure 1:
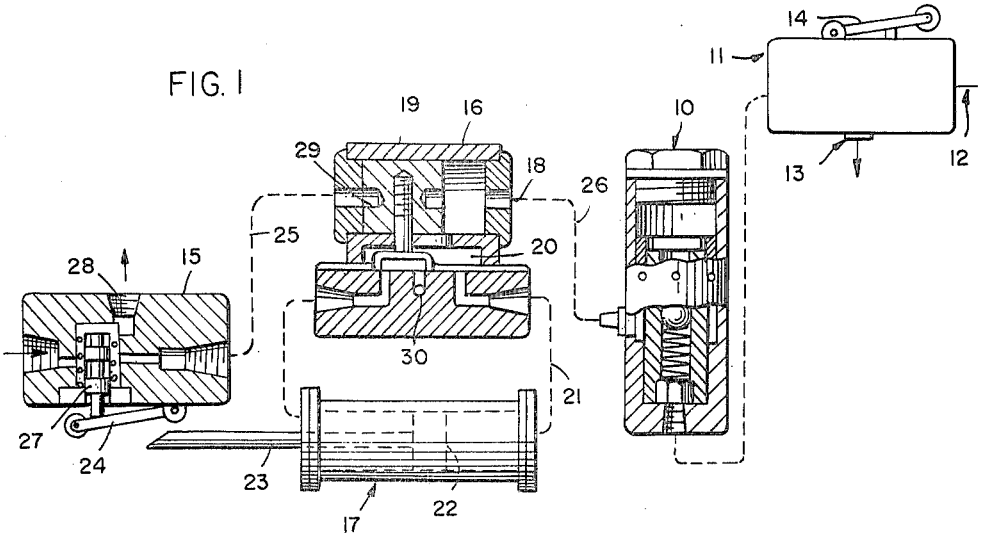
FIG. 1 is a schematic representation of a system embodying a work cylinder and equipped with the inventive impulse valve.

Reference is made to FIG. 1 initially to describe an important application of the inventive valve. In FIG. 1, the valve is designated generally by the numeral 10 and is seen to be interconnected to a first actuator valve 11, which advantageously may be of the form seen in coowned, copending application of Robert I, Bingel, Serial No. 302,336, filed August 15, 1963. The valve 11 is coupled to a source of pressure fluid (not shown), i.e., compressed air, as at 12, and is equipped with an exhaust port as at 13. An actuator lever is provided on the three-way valve 11 as at 14. A similar actuator valve 15 is also interconnected in the fluid pressure system which includes also a master valve 16 and a work cylinder 17. The master valve 16 may be of the form seen in U.S. Patent No. 2,792,020.

In the operation of the system of FIG. 1, in which the cylinder 17 could take the form of a press, it is desired to return the work cylinder 17 to starting position after a predetermined stroke or work function. This return must occur irrespective of whether the first actuator valve is delivering pressure fluid to the system, i.e., the persistence of the initiating signal.

Upon initial depression of the lever 14, air from the source connection 12 is delivered to the right-hand side 18 of the master valve 16. This causes the spool 19 to move to the left and couples compressed air from the inlet 20 to the conduit 21, thereby moving the work cylinder piston 22 to the left. As the piston 22 moves to the extreme left, the piston rod 23 is arranged to contact the lever 24 of the second actuator valve 15 and apply pressure fluid through the line 25 to the left-hand side of the master valve 16.

Were it not for the interposition of the impulse valve 10, this would be ineffective to return the master valve spool 19 to the right, since pressures at 18 and 25 would balance each other. The impulse valve 10, however, serves to deliver pressure fluid through the line 26 to the right-hand side 18 for only a discrete time irrespective of the fact that the lever 14 is maintained in a depressed condition. Upon retraction of the rod 23, the lever 24 returns to the position shown in FIG. 1. This permits the valve spool 27 to move, venting pressure fluid from the line 25 to atmosphere through the exhaust port 28. Ultimately air is exhausted from the cylinder 17 by suitable movement of the element 29, to couple line 21 to the exhaust port 30 of valve 16.

Figure 3:
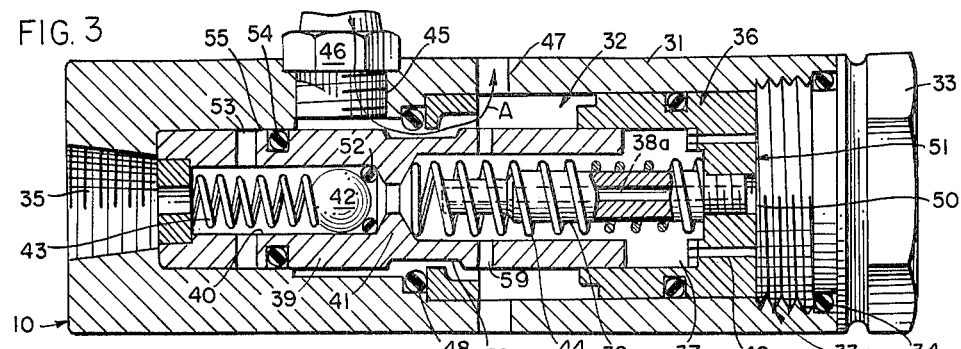
FIG. 3 is an elevational view, partially in section, of one form of the inventive valve and with fluid flow arrows applied so as to show the valve in its "ready" position for actuation, and forming part of a sequence of operation depicted in conjunction with FIGS. 4 and 5.

The valve responsible for this operation is seen in enlarged form in FIG. 3, and reference is now made to that view of the drawing. Referring now to FIG. 3, the numeral 31 designates a tubular body which is equipped with a longitudinally-extending bore 32. The bore 32 is closed at one end as at 33 by means of a plug equipped with a suitable O-ring seal 34, the plug being threadedly received on the threads 33a provided on the interior of the bore 32. The body 31 at the end of the bore opposite the plug 33 provides a port 35.

Mounted within the bore 32 is a larger spool 36 adjacent the end closed as at 33. The spool 36 itself has an axially-extending bore 37 and a hollow post 38 extending axially toward the open end of the body 31, i.e., the end of the body equipped with the axially-extending port 35.

The bore 32 further carries a smaller diameter spool 39 also equipped with a through bore 40. The bore 40 of the spool 39, midway of its length, is equipped with an annular, inwardly-extending shoulder 41 which provides a seat for a ball check valve 42. The ball valve 42 is urged against the seat by means of a coil spring 43. The spools 39 and 36 are urged apart by a second and heavier coil spring 44 which is partially received within both spools and which surrounds the hollow post 38.

Also provided are two transverse bores or ports, one at 45, which receives a fitting 46 adapted to be connected through pipeline 26 to the master valve 16 of FIG. 1; the other transverse bore includes opposite openings 47 spaced longitudinally of the first mentioned transverse bore 45 in the direction of the closed end 33. Between the two transverse bores 45 and 47, the body 31 provides an annular seal as at 48 operating against the smaller diameter spool 39.

The larger spool 36 is seen to be equipped with a pair of axially extending bores 49 which, in addition to the bore 50 provided on the axis of the spool (threadedly receiving the post 38), communicate the main bore 32 with the right-hand face 51 of the larger spool 36.

Still referring to FIG. 3, it will be seen that the smaller spool 39 is at the extreme left-hand end of the bore 32, while the second spool 36 is at the extreme right-hand end of bore 32. Further, the ball valve 42 is seated against the seat 41, which is seen to be advantageously equipped with an O-seal as at 52. The smaller spool 39 has a pair of transversely-extending bores 53 which are seen to be isolated from the first transverse port 45 by the coaction of an O-ring seal 54 with the wall of the bore 32 as at 55.

In the condition of the valve as seen in FIG. 3, no initiating signal is applied to the left-hand end, i.e., at the port 35. Therefore the valve is in condition to permit air to flow from a work piece along the path designated by the arrow A. Exhaust air can enter the valve at the transverse bore 45 and flow through the annular opening defined by the O-ring seal 52 and the reduced diameter portion 39a of the first spool 39. Thereafter, the air exhausts through the second transverse port or bore 47 as indicated.

As an initiating signal, i.e., compressed air, is applied to the left-hand end of the valve in FIG. 3, the air pressure begins moving the first spool 39 to the right.

Figure 4:
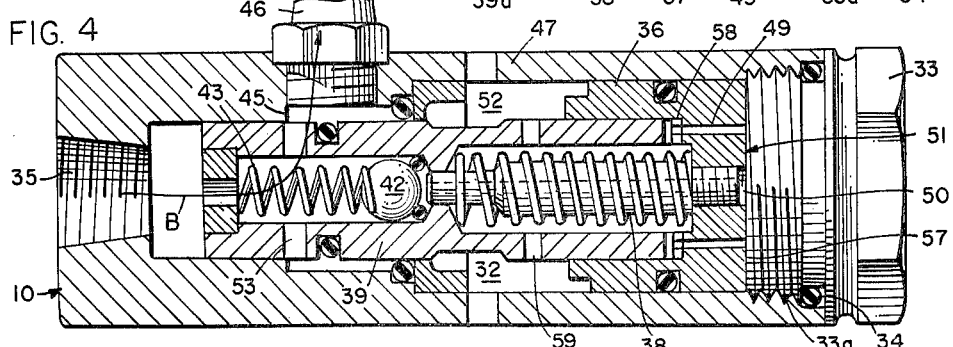
FIG. 4 is a partial sectional view of the valve seen in FIG. 3, but in an intermediate stage of operation.

Now referring to FIG. 4, which is the condition of the valve 10 after the application of pressure fluid to the inlet 35, it will be seen that the smaller spool 39 has been moved partway to the right and that the transverse bore 53 is in communication with the transverse port 45. In the illustration of FIG. 1, this results in the flow of pressure fluid from the source conduit 12 to the right-hand side 18 of the master valve 16. The flow of air made possible by this is shown in FIG. 4 by the arrow designated B.

As the smaller spool 39 completes its movement to the right (see FIG. 4), the ball valve 42 is engaged and unseated by the hollow post 38. This permits pressure fluid to flow around the ball 42 and a radial slot 56 in the hollow post 38 so as to exert pressure against the right-hand face 51 of the larger spool 36. Compressed air thereafter flows through the bore 38a of the hollow post 38. A portion of the pressure fluid is allowed to exhaust from the small space 57 existing between the right-hand face 51 of the spool 36 and the inner end of the cap 33. This exhausts through passages 49 to the chamber 32 to cause a slight delay of pressure rise in the chamber 57. This delay is stopped when the spool 39 "bottoms" on seal 58 and closes the axial port or passages 49. When this occurs, the second spool 39 is moved to the left and the resultant position is seen in FIG. 5.

Figure 5:
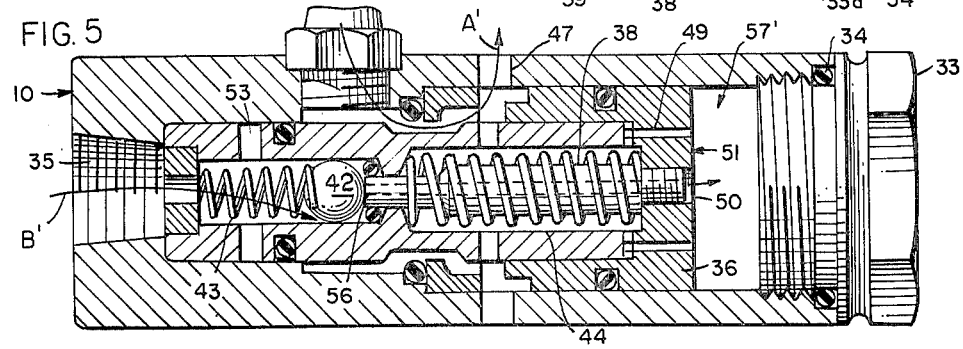
FIG. 5 is another view of the valve of FIG. 3 but in a yet subsequent stage of operation.

Now referring to FIG. 5, it will be seen that the larger spool 36 is moved considerably to the left and in so doing has carried with it the smaller spool 39. This results in the smaller spool 39 being returned to its "ready" position wherein the transverse bore 53 is isolated from the action or flow port 45 by the seal effected between the O-ring 54 and the wall portion 55 partially defining the bore 32. The hollow post 38 (still referring to FIG. 5) is at its extreme left position so as to be in contact with the ball valve 42 and prevent the same from seating.

With the positions of the spools 39 and 36 as seen in FIG. 5, continued application of pressure at the inlet port 35 serves to maintain the pressure within the space 57' (designated only in FIG. 5) with no possibility of the smaller spool 39 returning to the position seen in FIG. 4. Thus, no pressure fluid is delivered to the action port 45. The fluid flow relative to the bore 45 is again as it was in FIG. 3—the arrow denoting the flow in the FIG. 5 showing being designated by the symbol A'. However, air pressure is exerted because of the persistence of the initiating signal along a second path starting at the port 35 and which is depicted by an arrow designated B'. In the environment set forth in FIG. 1, this means that the spool 19 is not under any pressure from the right side.

With the relaxation of pressure at the inlet 35 and when the spool 36 is in its FIG. 5 position, fluid from the space 57' passes through the port 50 and out of the port 35 for exhaust from the three-way valve exhaust port 13. This reduces the pressure in the chamber 57' to a point where the heavier spring 44 starts moving the second spool 39 to the right, i.e., ultimately to the FIG. 4 showing. As the hollow post 38 is retracted from the ball 42, the ball valve 42 once again becomes seated against the O-ring 52 and the remaining pressure fluid from the chamber 57' is exhausted through laterally-extending ports 59 in the smaller spool 39—in FIG. 5, these are seen to be in alignment and therefore in communication with the transverse bores 47. When this is achieved, the valve 10 is once again in condition for actuation.

Figure 2:
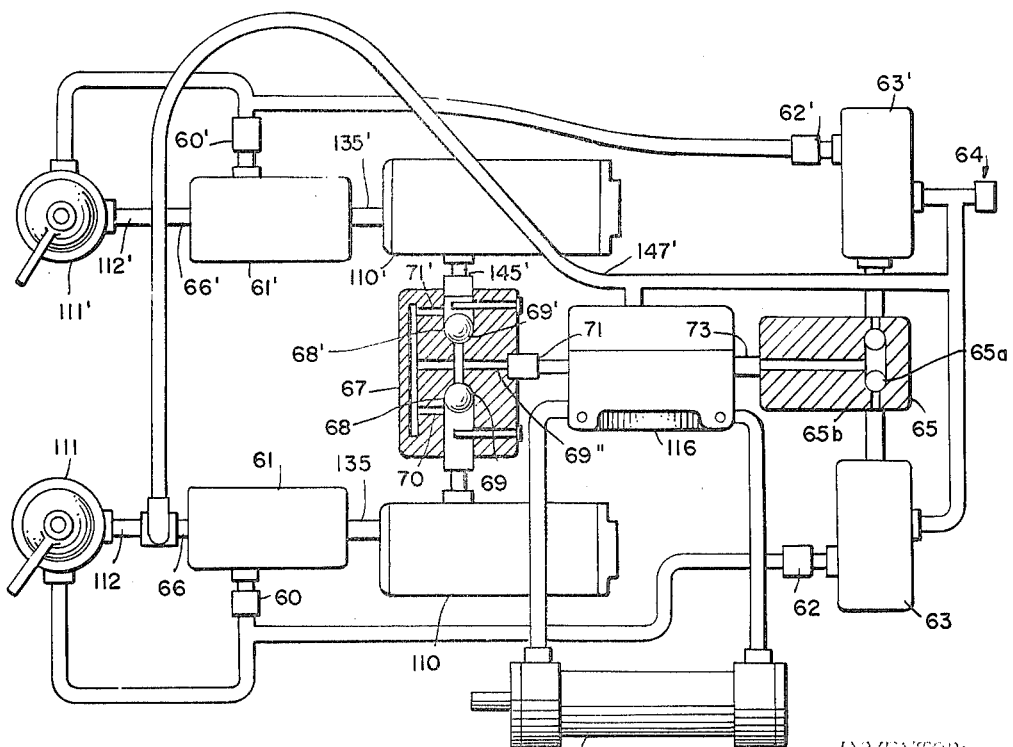
FIG. 2 is a schematic representation of a modified form of system and which incorporates two of the inventive valves.

Valves of the type seen in FIG. 3 and the description of which has been given with respect to FIGS. 3–5 find advantageous operation in connection with safety interlock systems such as those seen in FIG. 2. In FIG. 2, a work cylinder 122 (or larger master valve) is seen to be coupled to a master valve 116. Also provided are a pair of three-way actuating valves 111 and 111'. Still further, two impulse valves 110 and 110' are provided in the system. The object of the system of FIG. 2 is to insure that the operator simultaneously closes both of the actuator valves 111 and 111' in order to initiate the operation of the work cylinder 122. This insures that the operator will have his hands occupied and eliminates the possibility of having one hand in the vicinity of the press or other tool being operated by a master valve or work cylinder. Too often in the past safety devices of this nature have been circumvented by the operator being able to tie down one of the valves as at 111 or 111' and still operate the system with the other.

In the system shown in FIG. 2 and through the use of the impulse valves 110 and 110', this is impossible, i.e., the system 122 will not function unless both valves 111 and 111' are actuated simultaneously. When this simultaneous actuation occurs, pressure fluid entering the valves 111 and 111' as at 112 and 112', respectively, from air inlet 64, flows into the pilot ports 60 and 60' of the two three-way snap action (delays, then actuates quickly at a predetermined pressure) air piloted valves 61 and 61' and simultaneously into the pilot ports 62 and 62' of the three-way air piloted valves 63 and 63'. The valves 63 and 63' are arranged to exhaust the pilot port 73 of the four-way master valve 116 through the double ball check 65 when pressurized air is supplied to both the pilot ports 62 and 62'.

If pressurized air is supplied to only one valve 63 or 63', the ball 65a shifts to maintain pressurized air at port 73 of the four-way master valve, thereby preventing it from shifting. The air pilot valves 61 and 61' are arranged to supply pressurized air from ports 66 and 66' to ports 135 and 135' of the valves 110 and 110' when pressurized air is supplied to the pilot ports 60 and 60'. This results in both of the first spools (i.e., 39 in FIG. 3) of the valves 110 and 110' being moved to the right (in the illustration given in FIG. 2) in a simultaneous fashion so as to deliver pressure fluid simultaneously to the valve 67. This air seats the check valves 68 and 68' on seats 69 and 69' and flows through the restricted orifices 70 and 70' to the pilot port 71 of the four-way master valve. Since pressurized air has already been exhausted from pilot port 73 (valves 63 and 63' shift before delayed snap action valves 61 and 61'), the pressurized air at port 71 serves to actuate the spool of the master valve 116, which in turn delivers pressure fluid to the work cylinder 122.

However, if only one of the actuator valves 111 or 111' is actuated, for example, valve 111, pressure fluid from that valve will be delivered to the pilot actuator of valve 61, which in turn will introduce pressure fluid to port 135 of valve 110, which in turn will deliver a pulse of pressure fluid to the valve 67 seating check valve 68 on seat 69 and then passing through orifice 70 and through orifice 69" unseating ball 68'. However, the valve 110', having not been actuated, has its first spool 39 in the position seen in FIG. 3, wherein the port 45 is in direct connection with the port 47. Thus, air entering the valve 110' at 145' is immediately vented through the port 147' and no compressed air is delivered to the master valve 116. Also, if only one actuator, actuator 111, is actuated, pressurized fluid flows from air supply 64 through pilot valve 63' and the two-way ball check 65 seating ball 65a on seat 65b and into pilot port 73 filling the right pilot chamber of valve 116. This compressed air prevents any slight pressure rise at pilot port 71 resulting from the actuation of valve 111 from shifting the master four-way valve 116.

Figure 6:
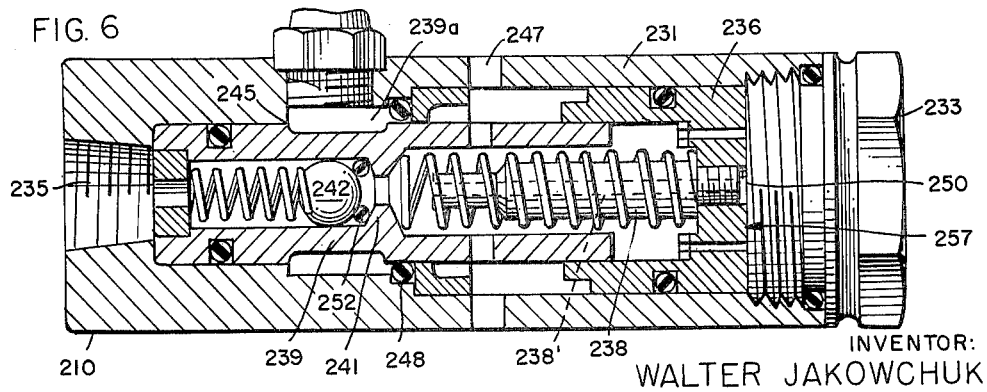
FIG. 6 is a view of a modified form of valve—the FIG. 6 valve being of the "bleed" type, while the valve of FIGS. 3-5 is of the "pressure" type.

Meanwhile the valve 110 proceeds through its cycle and ultimately the spools 36 and 39 thereof assume the position of FIG. 6, wherein the second spool 39 of the valve 110 in effect locks the valve 110 against delivering any further pressure fluid through the port 145 until the valve 111 is released. This insures that the system cannot be actuated by first depressing the lever (which may be of the type designated 14 in FIG. 1) of the valve 111 and tying the same down, after which the work cylinder 122 is operated by subsequent depression of the lever of the other valve 111'.

In some instances, it may be desired to utilize a bleed, as contrasted to a pressure, type impulse valve. Thus, instead of delivering pressure fluid through the port 45 to a work piece, it is desired to bleed air from the work piece through the port 45. An arrangement for this purpose is seen in FIG. 6, where numbers corresponding to those employed in FIG. 3 are used but with the exception of adding 200. Thus, the inlet port is 235, and the smaller spool is 239. The larger spool is designated 236, and it is seen that the arrangement of parts is essentially the same with the exception that the transverse bores 53 of the FIGS. 3–5 embodiment are omitted. Instead, the smaller spool 239 has its annular reduced area as at 239a moved to the left relative to the showing in FIG. 3. As the spool 239 is moved to the right, the action port 245 is coupled with the vent port 247. In the "ready" condition, the ports 245 and 247 are separated by the seal provided by the O-ring 248.

In the operation of the arrangement seen in FIG. 6, compressed air flows into the port 235. This air cannot flow longitudinally through the smaller diameter spool 239 because of the closed position of the ball valve 242. This results in the smaller diameter or telescoping spool 239 being urged to the right in FIG. 6 into further telescoping relation with the larger spool 236. Ultimately, this brings the hollow post 238 into engagement with the ball check valve 232 so as to unseat the same, i.e., remove it from its seated position on the seat 241. Thereupon, compressed air is able to flow through the bore 238a of the hollow post 238 and through the bore 250 into the space 257 adjacent the closed end 223 of the valve 210. This serves to move the larger spool 236 to the left, which necessarily returns the inner spool 239 to its original position. During the reciprocatory movement of the inner spool 239, the seal developed by the O-ring 248 and the outer surface of the inner spool 239 is broken so that communication is established between the ports 245 and 247, thereby providing a momentary or short-term venting of a work piece connected to the port 245. As before, so long as air pressure is applied to the interior of the valve 210, the outer spool 236 is maintained in its left position.

If a bleed of predetermined duration (or pulse in the case of the valve in FIGS. 3–5) is desired, the orifice opening 238a may be made adjustable.

While in the foregoing specification a detailed description of an embodiment of the invention has been set down for the purpose of illustration, many variations in the details herein given may be made by those skilled in the art without departing from the spirit and scope of the invention.

I claim:
1. An impulse valve, comprising:
   an elongated tubular body providing an elongated bore, a longitudinally-extending pressure fluid port at one end of said body and a pair of longitudinally spaced, laterally-extending ports in said body all communicating with said bore, an annular seal in said bore positioned between said laterally-extending ports,
   a first spool slidably mounted in said bore adjacent said one end for coaction with said seal, a longitudinally-extending bore in said first spool, check valve means in said bore normally closing the same, a reduced diameter portion in said first spool alignable with said annular seal in one position of said first spool to provide a flow passage between said laterally-extending ports,
   a bore-equipped second spool in said body bore and equipped with means for opening said check valve means upon relative spool movement, said first spool being telescopically received within said second spool bore, and
   spring means interposed between said first and second spools normally urging said second spool toward the other end of said body bore, flow of pressure fluid through said second spool bore when said check valve means is open being operable to move said second spool against the urging of said spring and to return said first spool toward said one body end.

2. The structure of claim 1 in which said first spool is equipped with a laterally-extending passage adapted to communicate said first spool bore with the transverse flow port between said seal and said body one end when said first spool is in a position remote from said body one end, whereby said valve is adapted to deliver pressure fluid to the last-mentioned transverse flow port, said reduced diameter portion being aligned with said annular seal when said first spool is in a position adjacent to said body one end.

3. The structure of claim 1 in which said first spool reduced diameter portion is aligned with said annular seal when said first spool is in a position remote from said body one end, whereby said valve is adapted to temporarily communicate said transverse ports upon pressure fluid being introduced through said longitudinally-extending port.

4. An impulse valve, comprising:
   an elongated tubular body having a longitudinally-extending bore closed at one end and providing a fluid pressure inlet at the other end, longitudinally-spaced, transversely-extending flow ports in said body between said ends communicating with said bore, an annular seal in said bore between said spaced-apart transverse flow ports,
   means connected to the transversely-extending flow port between said annular seal and said body other end for coupling the same to a workpiece,
   a first spool mounted for longitudinal reciprocation within said bore and equipped with a shoulder co-operating with said annular seal to maintain said transverse ports out of communication, said first spool being equipped with an axially-extending flow passage, a laterally-extending flow passage adapted to communicate said axially-extending flow passage with said connected port, a check valve in said passage,
   a second spool mounted in said bore for axial movement therein, said second spool being equipped with an axial passage in which said first spool is partially received, said second spool being equipped with upstanding post means for upsetting said check valve to permit pressure fluid flow through the axial passages of said spools to move both of said spools.

5. An impulse valve, comprising:
   an elongated tubular body having a longitudinally-extending bore closed at one end and providing a fluid pressure inlet at the other end, longitudinally-spaced, transversely-extending flow ports in said body between said ends communicating with said bore, an annular seal in said bore between said spaced-apart transverse flow ports,
   means connected to the transversely-extending flow port between said seal and said body other end for coupling the same to a workpiece,
   a first spool mounted for longitudinal reciprocation within said bore and equipped with a shoulder co-operating with said annular seal to maintain said transverse ports out of communication, longitudinal movement of said first spool bringing said transverse flow ports into communication, said first spool being equipped with an axially-extending flow passage, a check valve in said passage, a second spool mounted in said bore for axial movement therein, said second spool being equipped with an axial passage in which said first spool is partially received, said second spool being equipped with upstanding post means for upsetting said check valve to permit pressure fluid flow through the axial passages of said spools to move both of said spools and thereby return said first spool into engagement with said annular seal to interrupt the communication between said transverse flow ports.

6. An impulse valve, comprising an elongated body having an elongated bore extending partway therethrough from one end, first and second spools slidably mounted in said bore with said first spool being adjacent said one end and said second spool being positioned adjacent the other end of said body, a laterally-extending port in said body communicating with said bore, and means resiliently interconnecting said spools permitting said first spool to telescope within said second spool upon introduction of pressure fluid into said bore from said one end and by movement toward said other end and thereafter both of said spools to move toward said one end whereby flow of fluid is permitted in said port for only a discrete time following introduction of pressure fluid into said bore from said one end and irrespective of the continued application of pressure to said bore one end.

References Cited by the Examiner

UNITED STATES PATENTS

| | | | |
|---|---|---|---|
| 2,423,920 | 7/1947 | Yanchenko | 251—16 |
| 2,583,295 | 1/1952 | Greer et al. | 251—16 |
| 2,831,465 | 4/1958 | Perry | 251—39 |
| 2,986,121 | 5/1961 | Nowack | 91—424 |

SAMUEL LEVINE, *Primary Examiner.*

FRED E. ENGELTHALER, *Examiner.*